S. P. Carpenter,
Pegging Machine.

N°9,112.  Patented July 13, 1852.

UNITED STATES PATENT OFFICE.

SETH P. CARPENTER, OF MILFORD, MASSACHUSETTS.

INSTRUMENT FOR DRIVING NAILS IN DIFFICULT PLACES.

Specification of Letters Patent No. 9,112, dated July 13, 1852.

*To all whom it may concern:*

Be it known that I, SETH P. CARPENTER, of Milford, in the county of Worcester and State of Massachusetts, have invented a new and useful Apparatus for Driving Nails in Difficult Places or Where They Cannot Conveniently be Driven by the Aid of the Hand and a Hammer; and I do hereby declare that the same is fully described and represented in the following specification and the accompanying drawings, letters, figures, and references thereof.

Figure 2:
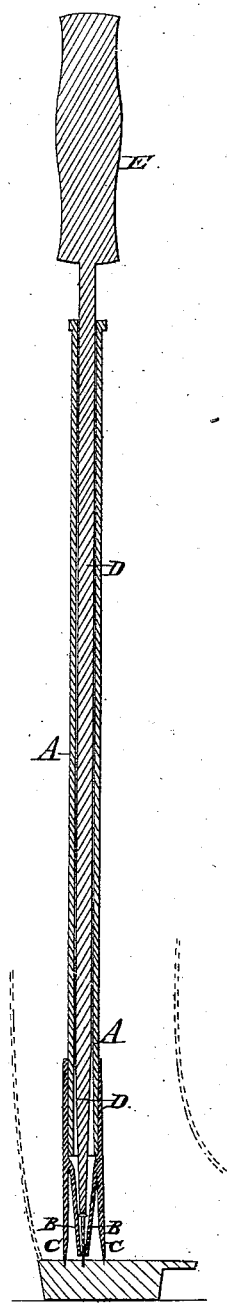
Figure 1:
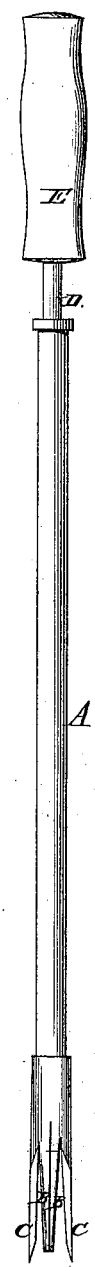

Of the said drawings Figure 1 denotes an external view of my apparatus. Fig. 2 is a vertical, central, and longitudinal section of it, showing at the same time how it may be inserted in a boot for the purpose of driving a nail down into the heel, it being particularly designed for the use of boot makers, although it may be employed to advantage to insert nails in many other things.

My apparatus is made as follows, that is to say, it consists of a long tube A made of metal or other suitable material provided at its lower end with springs B, B, so arranged, made, and applied, that a nail, when dropped into the tube will not only pass between the springs and be held by them from falling out of the tube, but, when sufficient force is applied to it to drive it out of the tube, such springs shall expand so as to permit it to pass out. To the tube A points or pointed wires C, C, are affixed so as to stand on each side of and project a little below the bottom of the tube as seen in the drawings. A ram rod D is used in the tube and in connection with it, such ram-rod being surmounted if necessary by a heavy weight or head E. The pointed wires C, C, serve to keep the lower end of the instrument in place when and while a nail is to be driven.

In using the instrument, a nail as denoted by red lines in Fig. 2 is to be inserted in the tube A, and the tube inserted in the place which cannot be conveniently reached by the hand of a person and a hammer so as to drive a nail in the part thereof where it may be desirable to drive one. The lower end of the tube should be placed against the spot where it may be desirable to drive the nail. This done the ramrod is used to force the nail out of the tube and into the surface into which it is to be driven. In doing this the ramrod may be lifted in the tube and allowed to fall back on the head of the nail, or it may be forced down by pressure, or one or more blows on its upper end.

What I claim as my invention is—

The instrument as constructed of a combination of a tube A, two or more springs B, B, one or more holding points C, C, and ramrod D, and made to operate substantially as hereinbefore specified.

In testimony whereof I have hereto set my signature, this twenty eighth day of February, A. D. 1852.

SETH P. CARPENTER.

Witnesses:
 R. H. EDDY,
 G. W. CUTLER.